Figure 1:
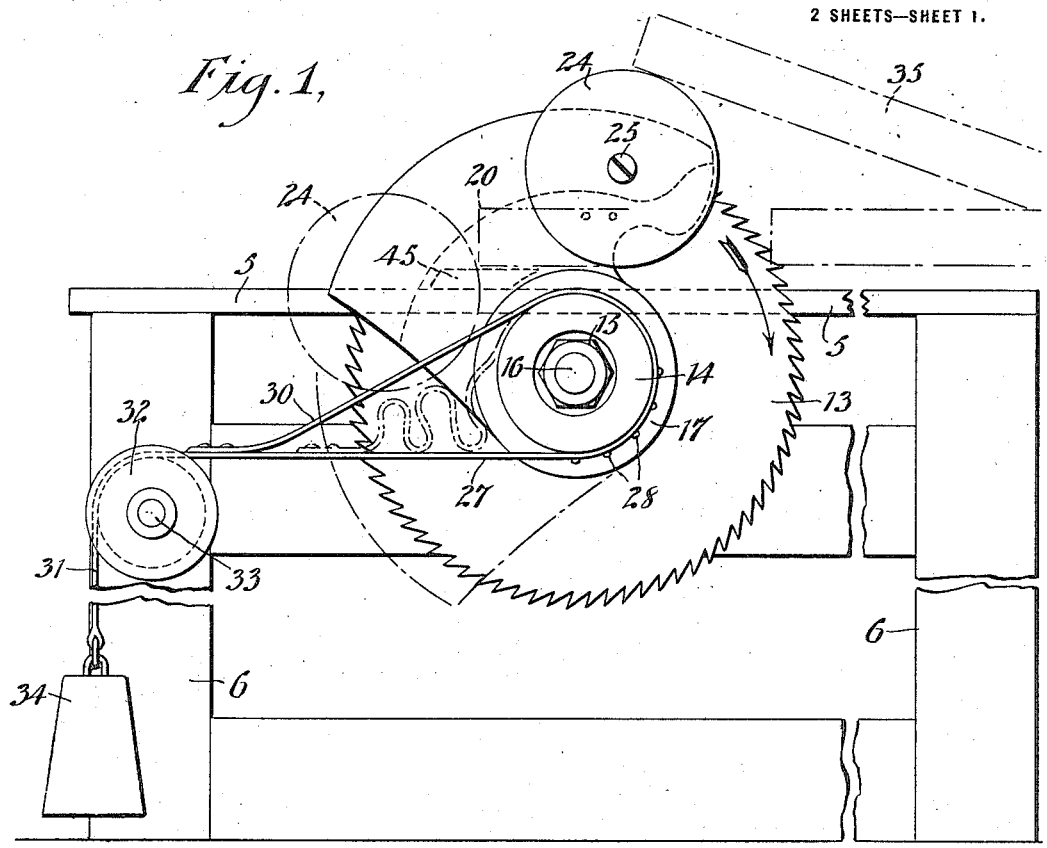

C. E. EVANS.
CIRCULAR SAW GUARD.
APPLICATION FILED DEC. 5, 1913.

1,163,517.

Patented Dec. 7, 1915.
2 SHEETS—SHEET 1.

WITNESSES
Edw. Thorpe
E. B. Marshall

INVENTOR
Charles E. Evans
BY
Munn & Co.
ATTORNEYS

C. E. EVANS.
CIRCULAR SAW GUARD.
APPLICATION FILED DEC. 5, 1913.
1,163,517.
Patented Dec. 7, 1915.
2 SHEETS—SHEET 2.
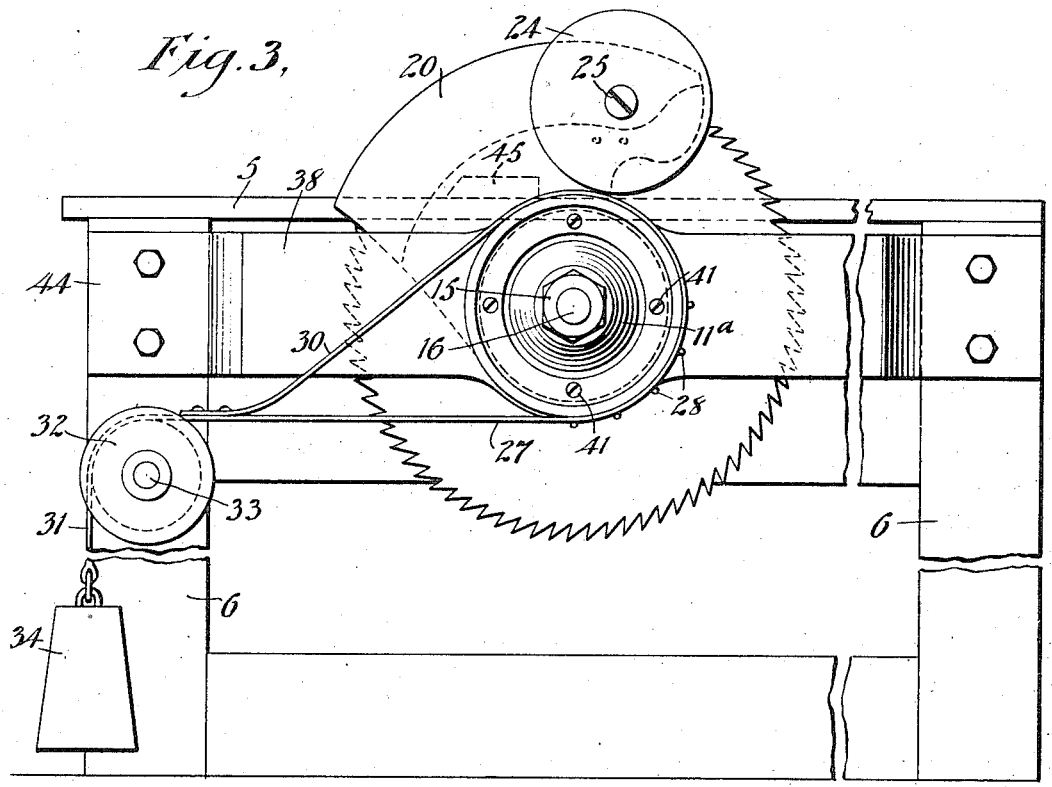
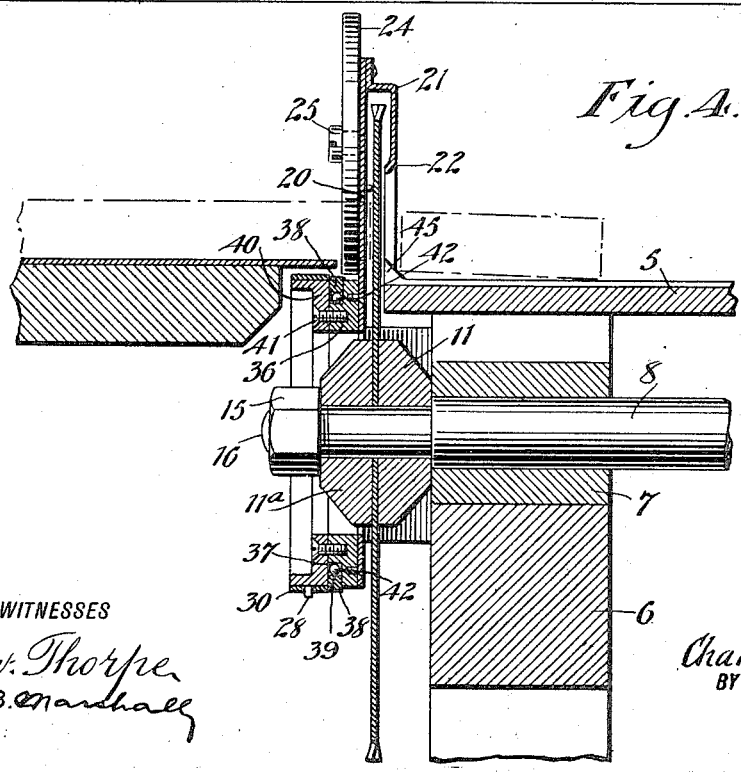
WITNESSES
Edw. Thorpe
E. B. Marshall
INVENTOR
Charles E. Evans
BY
Munn & Co
ATTORNEYS

UNITED STATES PATENT OFFICE.

CHARLES EDMOND EVANS, OF WEED, CALIFORNIA, ASSIGNOR TO LUMBERMAN'S SPECIALTIES COMPANY, OF WEED, CALIFORNIA, A CORPORATION OF CALIFORNIA.

CIRCULAR-SAW GUARD.

1,163,517.  Specification of Letters Patent.  Patented Dec. 7, 1915.

Application filed December 5, 1913. Serial No. 804,844.

*To all whom it may concern:*

Be it known that I, CHARLES E. EVANS, a citizen of the United States, and a resident of Weed, in the county of Siskiyou and State of California, have invented a new and Improved Circular-Saw Guard, of which the following is a full, clear, and exact description.

My invention has for its object to provide a circular saw guard normally disposed over a saw and adapted to pass below the cut off table when the saw is being used.

Other objects of my invention are to provide an anti friction member on the guard which may be engaged by the lumber to be cut for pushing the guard below the table, means for holding the guard yieldingly over the saw, and means for shunting the cut off portions of the lumber from the saw.

Other objects of the invention will appear in the following specification in which the preferred form of my invention is described.

In the drawings similar reference characters refer to similar parts in all the views in which—

Figure 2:
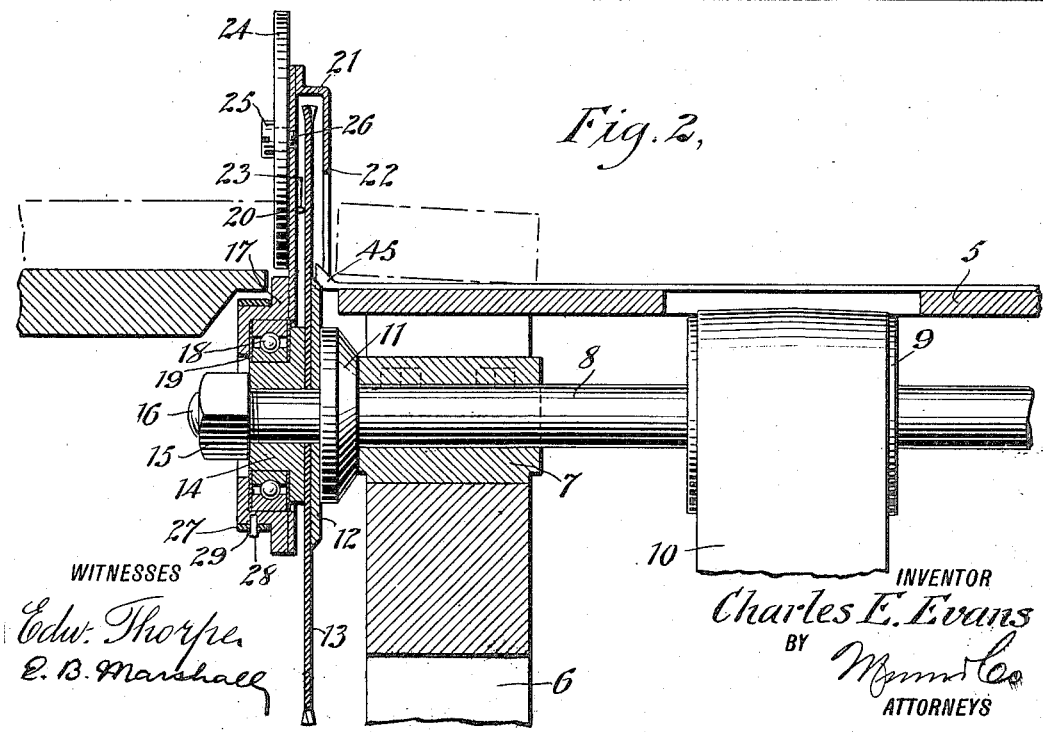

Figure 1 is a side elevation of a circular saw showing my guard; Fig. 2 is a transverse sectional view of Fig. 1; Fig. 3 is a side elevation of a circular saw showing the modified mounting for my guard, and Fig. 4 is a transverse sectional view of Fig. 3.

By referring to the drawings it will be seen that a saw table 5 is provided which is supported on legs 6, this saw table 5 being provided with bearings 7 in which the spindle 8 is journaled. Mounted on the spindle 8 there is a pulley 9, over which the belt 10 is disposed in the customary manner for driving the spindle 8. Mounted on the spindle 8 and secured thereto there is an inside collar 11 against which is disposed a disk shunter 12, the disk shunter 12 being disposed between the inside collar 11 and the circular saw 13 which is also mounted on and is secured to the spindle 8. Against the other side of the saw 13 and mounted on the spindle 8 there is an outside collar 14, this outside collar 14 being held in place by the nut 15 which meshes with the threaded terminal 16 of the spindle 8. Disposed around the outside collar 14 there is an outside collar casting 17, the outside collar casting 17 being mounted to rotate relatively to the outside collar 14 and being separated therefrom by the ball-bearings 18. Felt washers are used at the sides of the ball-bearings 18 for the purpose of retaining grease or lubricants. Mounted on the outside collar casting 17 there is a plate 20, and secured to this plate 20 there is a saw guard 21 which is normally disposed over the top of the saw 13. The lower portion 22 of this saw guard 21 is bent in and against the saw to prevent the saw from moving laterally to injure its teeth by engagement with the saw guard. Pins 23 are disposed inwardly from the plate 20 to prevent the saw 13 from moving laterally in the opposite direction, which would injure the teeth of the saw by their engagement with the plate 20. There is a wheel 24 which is mounted on a screw 25, meshing in a threaded orifice 26 in the plate 20, this wheel 24 being provided for engagement by the lumber to move the guard 21 rearwardly and below the horizontal plane of the table 5.

The guard 21 is held yieldingly over the top of the saw 13 by means of the strap 27 which is looped and is disposed around the outside collar casting 17, the outside collar casting 17 being provided with pins 28 which are disposed in orifices 29 in the strap 27 to prevent the rotary movement of the outside collar casting 17 relatively to the strap 27. A terminal 30 of the strap 27 is secured to the body of the strap, and the other terminal 31 of the strap is disposed over a pulley 32 mounted for rotating on a stud 33 secured to a leg of the table. To this terminal 31 of the strap 27 there is secured a weight 34. The weight 34 serves to hold the outside collar casting 17 with the guard 21, disposed as shown in the full lines of Fig. 1 of the drawings. When a piece of lumber is moved against the saw, the lumber will contact with the wheel 24 and will force the wheel, the plate 20 and the guard 21 rearwardly, the end of the piece of lumber, at first engaging the bottom of the wheel, but as the wheel moves rearwardly, the lumber will ride up on and over the wheel to press the plate 20 and the guard 21 substantially below the horizontal plane of the table 5 to uncover the saw 13. When the pressure of the lumber against the wheel 24 is removed, the weight 34 together with the strap 27 and the outside collar casting 17, will serve to move the plate 20 together with the wheel 24 and the guard 21 upwardly and forwardly to its normal position as shown in the full lines of Fig. 1 of the drawings.

By referring to Fig. 1 of the drawings, it will be seen that a board, shown by the dotted lines 35, may be dropped on the top of the wheel 24, the wheel 24 acting as an anti friction device, the weight of the board serving to throw the guard 21 together with the plate 20, rearwardly so that the board 35 may be engaged by the saw 13, the board as it is cut dropping to a horizontal position.

In Figs. 3 and 4 of the drawings, a construction is disclosed which corresponds in all particulars to the construction shown in Figs. 1 and 2 of the drawings with the exception of the mounting of the plate 20. In the modified form this plate 20 is secured to a circular bearing member 36 having a recess 37 in which is disposed a plate 38 around a circular opening 39 therein. A companion bearing member 40 is secured to the bearing member 36 at the outer side of the plate 38 by means of screws 41 which mesh in threaded orifices in the bearing members 40 and 36. Disposed between the plate 38 and the bearing member 36 at its recess 37 there are ball-bearings 42. In the construction shown in Figs. 3 and 4, the usual type of outside collar 11ª is used. The plate 38 is offset at 43 and its end portions 44 are secured to the legs of the table. The shunter 45 is secured to the top of the table and receives the cut-off portions of the lumber from the disk shunter 12 and removes it to a safe distance from the saw 13. This shunter 45 is disposed in the rear of the disk shunter 12.

Having thus described my invention, I claim as new and desire to secure by Letters Patent:

1. In a circular saw guard, a rotatably mounted bearing member, a plate secured to the bearing member, a saw guard secured to the plate and a wheel mounted for rotating on the plate and extending above the saw guard for engagement by the lumber to be cut.

2. In combination with a saw mounted on a spindle, a guard for rotating substantially coaxially with the spindle, and a wheel mounted for rotating on the guard, the wheel extending above the horizontal plane at the top of the guard when the guard is in normal position.

3. In combination with a saw mounted on a spindle, a bearing member rotatably mounted substantially coaxially with the spindle, a plate carried by the bearing member, a guard secured to the plate, a looped strap disposed around the bearing member and secured thereto, a pulley, the strap having a terminal disposed over the pulley and a weight secured to the terminal.

4. In combination with a saw mounted on a spindle, a bearing member mounted for rotating on the spindle, a plate secured to the bearing member, a saw guard secured to the plate, a member mounted on the plate for engagement by the lumber to be cut, a looped strap disposed around the bearing member and secured for rotating therewith, a pulley, the looped strap having a terminal disposed over the pulley and a weight secured to the terminal of the strap.

5. In a circular saw guard, a bearing member, a saw guard mounted on the bearing member and having an impact member disposed at its forward end and adjacent to the top of the saw guard, the impact member being rounded with its axis disposed in a horizontal plane which is adjacent to the top of the saw guard.

6. In a circular saw guard, a table having bearings, a spindle journaled in the bearings, a saw mounted on the spindle, a plate secured to the table and having a circular opening substantially coaxially with the spindle, a member journaled in the opening, a plate secured to the member, a saw guard secured to the plate and a member mounted on the plate for engagement by the lumber to be cut.

In testimony whereof, I have signed my name to this specification in the presence of two subscribing witnesses.

CHARLES EDMOND EVANS.

Witnesses:
JAMES G. CATCHETT,
R. P. CLARK.